United States Patent
Hsu et al.

(10) Patent No.: US 7,996,558 B2
(45) Date of Patent: Aug. 9, 2011

(54) METHODS AND SYSTEMS FOR A ROUTING PROTOCOL

(75) Inventors: Yuan-Ying Hsu, Taipei (TW); Jen-Shun Yang, Jhubei (TW); Chien-Chao Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 748 days.

(21) Appl. No.: 11/882,224

(22) Filed: Jul. 31, 2007

(65) Prior Publication Data

US 2008/0040507 A1  Feb. 14, 2008

Related U.S. Application Data

(63) Continuation-in-part of application No. 11/067,687, filed on Mar. 1, 2005, now Pat. No. 7,280,489.

(60) Provisional application No. 60/838,892, filed on Aug. 21, 2006.

(51) Int. Cl.
*G06F 15/173* (2006.01)
*G06F 15/16* (2006.01)

(52) U.S. Cl. ........ 709/241; 709/245; 370/310; 370/349; 370/386; 455/445

(58) Field of Classification Search .......... 370/310, 370/349, 351, 386, 389; 455/445; 709/220–222, 709/238–245
See application file for complete search history.

(56) References Cited

U.S. PATENT DOCUMENTS

| | | | |
|---|---|---|---|
| 2002/0126662 A1* | 9/2002 | Geevarghese et al. | 370/389 |
| 2003/0023753 A1* | 1/2003 | Rychlicki | 709/245 |
| 2003/0225912 A1* | 12/2003 | Takeda et al. | 709/246 |
| 2005/0220054 A1* | 10/2005 | Meier et al. | 370/331 |
| 2006/0184657 A1* | 8/2006 | Rezvani et al. | 709/223 |
| 2006/0245360 A1* | 11/2006 | Ensor et al. | 370/238 |

OTHER PUBLICATIONS

Elizabeth M. Royer et al., "A Review of Current Routing Protocols for Ad Hoc Mobile Wireless Networks", IEEE Personal Communications, Apr. 1999, pp. 46-55.
Charles E. Perkins et al., "Highly Dynamic Destination-Sequenced Distance-Vector Routing (DSDV) for Mobile Computers", SIGCOMM 94, Aug. 1994, London England, pp. 234-244.
Hidenori Aoki et al., "802.11 TGs Simple Efficient Extensible Mesh (SEE-Mesh) Proposal", Jan. 9, 2006, IEEE 802.11-05/0562r4, pp. 1-152.

* cited by examiner

*Primary Examiner* — George Eng
*Assistant Examiner* — Marcos L Torres
(74) *Attorney, Agent, or Firm* — Finnegan, Henderson, Farabow, Garrett & Dunner, LLP

(57) ABSTRACT

A method for routing data, using a stateless routing protocol includes communicating data between a source host and a destination host in a network with a plurality of hosts. Each host in the network has a unique numerical address. The method comprises determining a least common ancestor host of the source host and the destination host using the unique numerical address of each of the source and destination hosts. The data is sent from the source host to the least common ancestor host, and then sent from the least common ancestor host to the destination host. Alternatively, the data can be routed using a stateful routing protocol in which each host records the address of its neighbors and forwards the data to the neighbor host that is closest to the destination host.

12 Claims, 17 Drawing Sheets

```
1    x=seqGCD(src, dst)
2    // setting up the routing path from src to x
3    while(src!=x){
4        parent=src/(the largest prime factor of src)
5        add parent into the routing path
6        src=parent
7    }
8    // setting up the routing path from x to dst
9    int primeFactors[]
10   primeFactors = pfSeq(dst/x)
11   for(int k=0; k<number of elements in primeFactors; k++){
12       child=x
13       for(int i=0; i<k; i++){
14           child=child*primeFactors[i]
15       }
16       add child into the routing path
17   }
```

FIG. 8

```
1    x-seqGCD(cur, dst);
2    if(x<cur){
3        parent = cur/(the largest prime factor of cur)
4        send packet to parent
5    }else if(x==cur){
6        child=x*(the smallest prime factor of (dst/x))
7        send packet to child
8    }
```

FIG. 10

```
1    seflGcdValue=seqGCD(cur, dst);
2    for (int i=0; i<number of neighbors; i++){
3        neighborGcdValue[i]=seqGCD(address of neighbor[i], dst);
4    }
5    gNeighborGcdValue = the largest neighborGcdValue;
6    If(gNeighborGcdValue>=selfGcdValue){
7        send packets to the node with gNeighborGcdValue;
8    }else if(gNeighborGcdValue==selfGcdValue){
9        send packets to the parent node;
10   }
```

FIG. 12

METHODS AND SYSTEMS FOR A ROUTING PROTOCOL

RELATED APPLICATIONS

This application claims benefit from Provisional Application No. 60/838,892 filed on Aug. 21, 2006, and is a Continuation-in-Part of U.S. patent application Ser. No. 11/067,687 filed on Mar. 1, 2005, now U.S. Pat. No. 7,280,489, the contents of both of which are incorporated in their entirety herein by reference.

FIELD OF THE INVENTION

The present invention generally relates to allocating addresses for hosts in a wireless multi-hop network. The present invention further relates to providing a routing protocol for wireless mesh/relay networks.

BACKGROUND OF THE INVENTION

A wireless multi-hop network is usually a wireless network without the support of base stations, such as a mobile ad-hoc network (MANET), sensor network, or wireless mesh network (WMN). Without base stations, wireless networks provide high flexibility but are limited to using existing communication methods designed for infrastructure directly. Accordingly, the address allocation in a wireless multi-hop network may be more complicated to maintain efficiency and uniqueness.

Traditionally, a host can configure its address statically or dynamically. In the static configuration, users may need to acquire an available address in advance and manually configure the address. However, it may not be reasonable for users to do manual configuration in a flexible multi-hop network. Another choice is dynamic configuration, which allows a host to configure an address dynamically, such as by use of a Dynamic Host Configuration Protocol (DHCP).

DHCP is a centralized allocation mechanism, which deploys at least one fixed server to manage all addresses in the network. FIG. 1 shows typical components in a DHCP system and messages they exchange. As shown, there are two DHCP servers 11, 12 and one DHCP relay 13 for DHCP server 12. When a new host 14 joins a multi-hop wireless network, it broadcasts a DHCP_Discover message to request an address. All hosts in the network except DHCP relay 13 will help rebroadcast this message until it reaches DHCP servers 11, 12. The DHCP relay 13 will unicast the message to the DHCP server 12 directly. Upon receiving the DHCP_Discover message, each of the DHCP servers 11, 12 will allocate an address and send a DHCP_Offer message with the address back to the new host 14. Therefore, the new host 14 may receive multiple DHCP_Offer messages to choose between. New host 14 then broadcasts a DHCP_Request message to inform all servers 11, 12 of its choice, for example server 12. The chosen server 12 will check if the allocated address is really available and, if available, sends a DHCP_Ack to the new host 14. At this time, the new host 14 can configure the allocated address as its address and start the process of DAD (Duplicate Address Detection) to guarantee that no other hosts in the network use such an address. After a lease time, which is assigned by the server 12 notifying how long the host 14 can use the allocated address, the host 14 reclaims the address by DHCP_Request. If the address is still available, the server 12 will send a DHCP_Ack message to the host 14. Otherwise, a DHCP_Nack message will be sent and the host 14 needs to perform the whole procedure starting from broadcasting DHCP_Discover again.

In view of the message flows of DHCP, it is known that, in dynamic configurations, broadcasts are usually necessary to acquire an address or detect an address conflict. However, using a broadcast in a wireless multi-hop network is very expensive and may cause a broadcast storm problem.

In the known address allocation mechanisms, self-configuration is a distributed address allocation mechanism, in which a host can configure its address by itself according to different factors, such as its hardware address (S. Cheshire, B. Aboba, and E. Guttman, Dynamic Configuration of IPv4 Link-Local Addresses, draft-ietf.zeroconf-ipv4-linklocal-17.txt, IETF Zeroconf Working Group, July 2004; S. Thomson and T. Narten, IPv6 Stateless Address Autoconfiguration, RFC 2462, December 1998) or a random number (C. E. Perkins, J. T. Malinen, R. Wakikawa, E. M. Belding-Royer, and Y. Sun, IP Address Autoconfiguration for Ad Hoc Networks, draft-ietfmanet-autoconf-01.txt, IETF MANET Working Group, July 2000). Since a self-configured address is generated by an individual host, the address has to be checked by DAD to confirm that it is not occupied by other hosts. Therefore, broadcasts are still necessary to detect address confliction.

MANETconf (S, Nesargi, and R. Prakash, MANETconf: Configuration of Hosts in a Mobile Ad Hoc Network, INFOCOM 2002) is also a distributed method of address allocation in MANET by making all hosts record used addresses, wherein a new host acquires an address from one of its neighbors, and the neighbor finds an address not existing in its record and asks for confirmation by all other hosts in the MANET. If the address is not used by any other host, it will be assigned to the new host. In MANETconf, since confirmations are required from all other hosts, broadcasts are still required.

Prophet address allocation (H. Zhou, L. M. Ni, and M. W. Mutka, Prophet address allocation for large scale MANETs, INFOCOM 2003) tries to find a function which can generate a unique sequence of addresses for each host to be assigned in order. As a result, each host can directly assign addresses in the order of its address sequence without asking other hosts. However, it can be complex to maintain uniqueness between sequences, and the uniqueness is difficult to achieve when the address space is small. As a result, prophet address allocation is limited in a MANET with a large address space.

In US Publication No. US2004/0174904A1 for a "Method of allocating IP address and detecting duplication of IP address in an ad-hoc network environment", each host maintains a history table and a DAD table. The history table of a host stores the address history information of the host. The DAD table stores all neighbor address information. A 'HELLO' message is sent periodically between neighbors to update DAD tables. When a host needs an address, it sends a request message to its neighbors. If a neighbor finds such address in its DAD table, it will send a response message with an available message to the host, whereas other neighbors finding no such addresses in their DAD tables keep silent. If the host receives a response message from its neighbors, it sends a request message with such address for duplicate detection again. The process of duplicate detection will continue until no response message is received for N times. Such a method does not involve a broadcast in the whole network. However, 'HELLO' messages between neighbors are always sent periodically. This can still cause significant signal overhead in the network.

Furthermore, traditional wireless multi-hop networks use routing protocols that are modified versions of routing protocols used in ad hoc networks. These protocols can be classified as reactive, proactive, and hybrid protocols. Reactive protocols, such as AODV (Ad hoc On-demand Distance Vector), allow for a sending host to broadcast a route request to all of its neighbors, each neighbor in turn rebroadcasting the route request to its neighbors, and so on, until the destination host is found. Hosts using proactive protocols, such as OLSR (Optimized Link State Routing), periodically exchange their link status with each other to maintain routing paths to the other hosts. Finally, hybrid protocols, such as ZRP (Zone Routing Protocol), combine the reactive and proactive protocols by maintaining routing information using a periodic exchange of link status only within particular zones. Hosts using the ZRP then use the reactive protocol to access hosts that are located in different zones. Therefore, all of these ad hoc protocols require an extensive exchange of information with other hosts in order to configure a routing path. This can be undesirable because it may lead to added overhead and increased latency in the network.

SUMMARY OF THE INVENTION

Accordingly, an embodiment of the present invention is to provide an improved routing protocol for wireless mesh/rely networks which may be, for example, achieved by enabling each host to configure routing paths by referring to the addresses of the sending host and the destination host.

To achieve these and other advantages, and in accordance with the purpose of the present invention as embodied and broadly described, there is provided a method for routing data, using a stateless routing protocol, between a source host and a destination host in a network including a plurality of hosts, wherein each of the hosts has a unique numerical address, the method comprising: determining a least common ancestor host of the source host and the destination host using the unique numerical address of each of the source and destination hosts; sending the data from the source host to the least common ancestor host; sending the data from the least common ancestor host to the destination host; and processing the data at the destination host.

Further in accordance with the present invention, there is provided a method for routing data, using a stateful routing protocol, between a source host and a destination host in a network including a plurality of hosts, wherein each of the hosts has a unique numerical address, the method comprising: recording addresses of neighboring hosts; and sending data to the neighboring host that is closest to the destination host.

Still further in accordance with the present invention, there is provided a system for routing data between a plurality of networked hosts with unique numerical addresses using a stateless routing protocol, the system comprising: a sending host adapted to: determine a least common ancestor host using the unique numerical address of each of the source and destination hosts, and send data to the least common ancestor host; and a destination host to receive the data from the least common ancestor host and processes the data.

Still further in accordance with the present invention, there is provided a system for routing data between a plurality of networked hosts with unique numerical addresses using a stateful routing protocol, the system comprising: a sending host to record numerical addresses of neighboring hosts; and a destination host to receive data; wherein the sending host first sends data to the neighboring host that is closest to the destination host.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain principles of the invention.

BRIEF DESCRIPTION OF THE DRAWINGS

FIG. 8 is pseudocode for implementing a source routing method consistent with embodiments of the present invention;

FIG. 10 is pseudocode for implementing a hop-by-hop routing method consistent with embodiments of the present invention;

FIG. 12 is pseudocode for implementing a stateful hop-by-hop routing protocol consistent with embodiments of the present invention;

DESCRIPTION OF THE EMBODIMENTS

Reference will now be made in detail to present embodiments of the invention, examples of which are illustrated in the accompanying drawings. Wherever possible, the same reference numbers will be used throughout the drawings to refer to the same or like parts.

Figure 1:
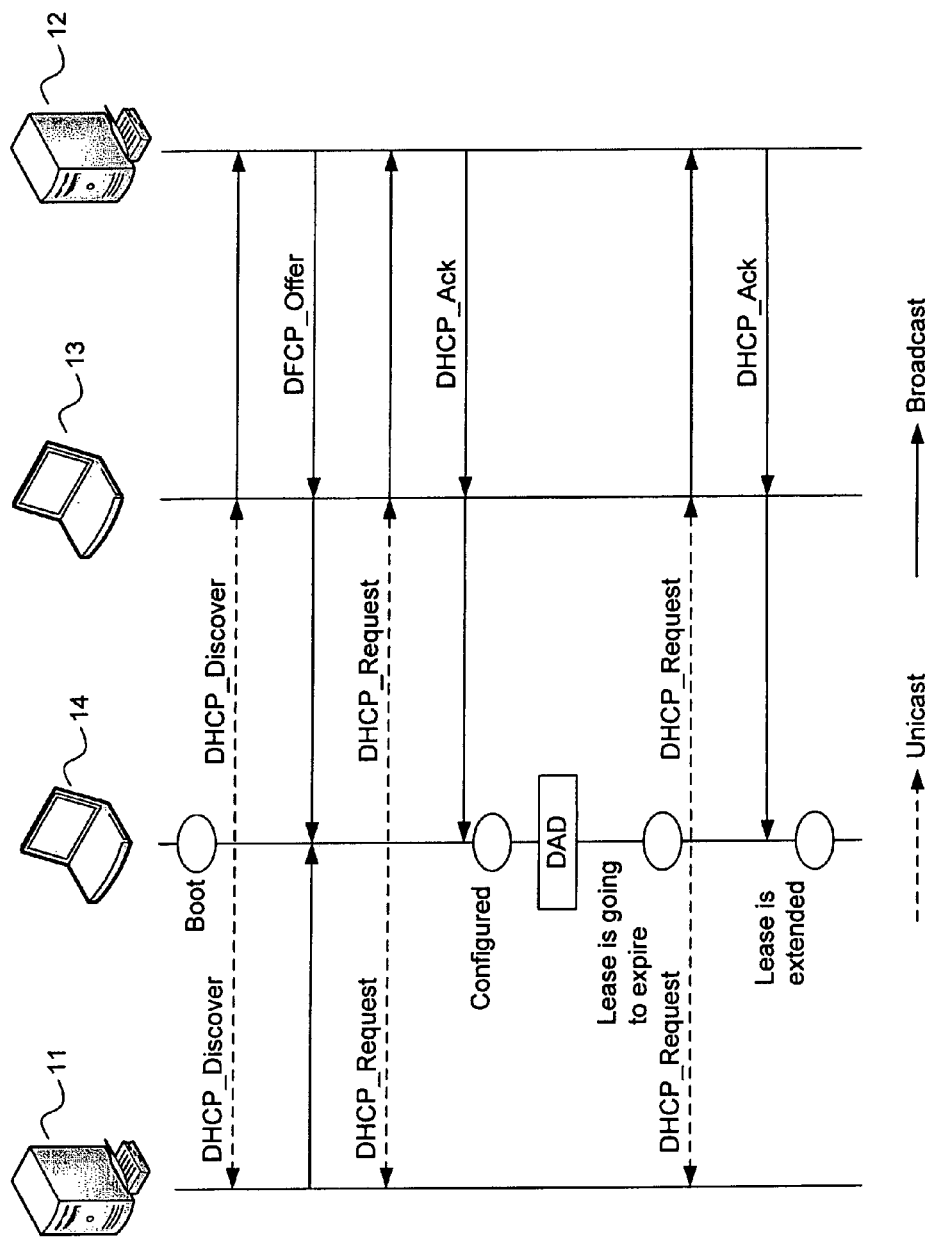
FIG. 1 is a diagram showing interaction between components in a typical DHCP setup.
Figure 2:
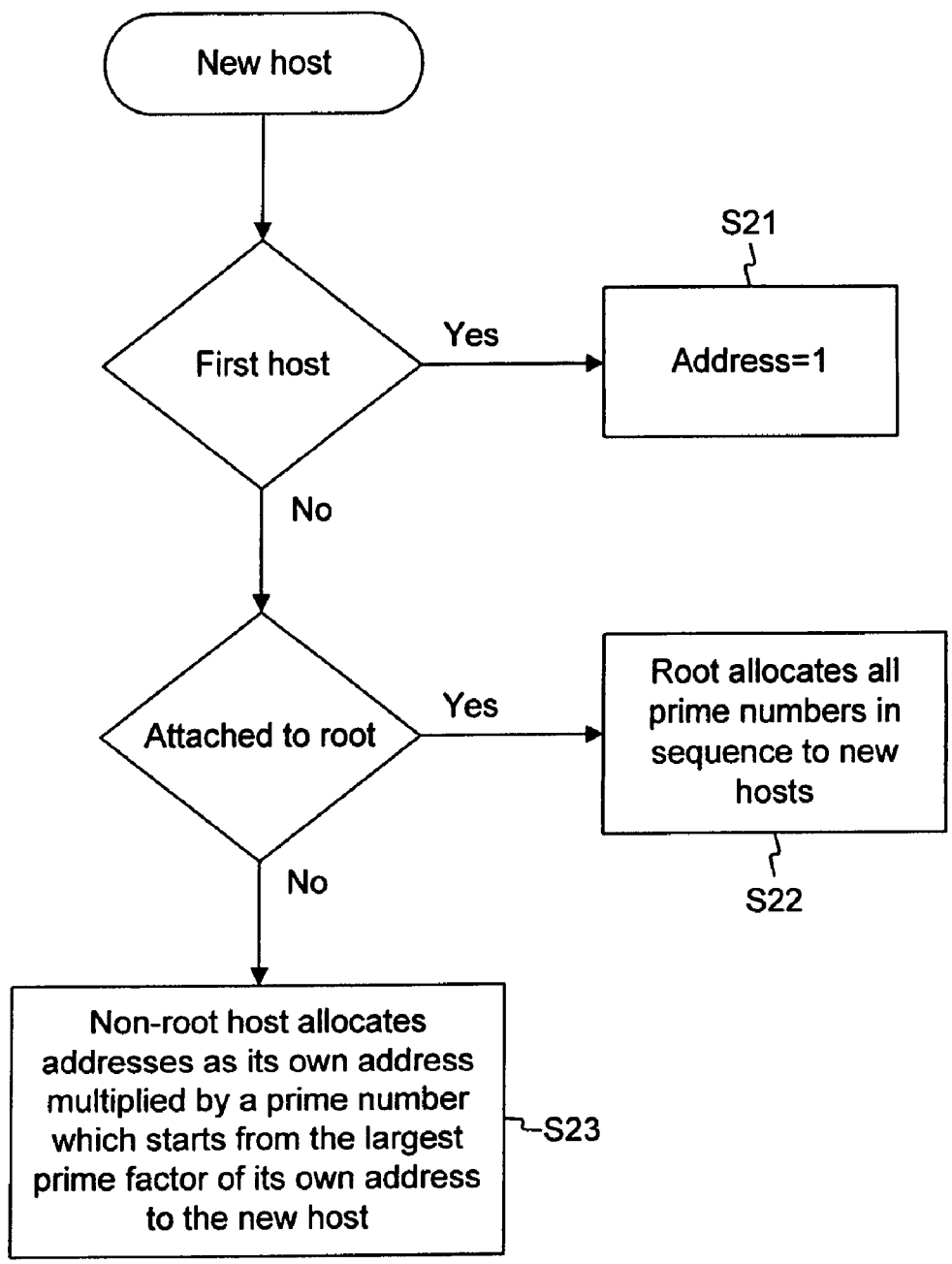
FIG. 2 illustrates a flowchart of a prime numbering address allocation method in a wireless multi-hop network consistent with embodiments of the present invention.
Figure 3A:
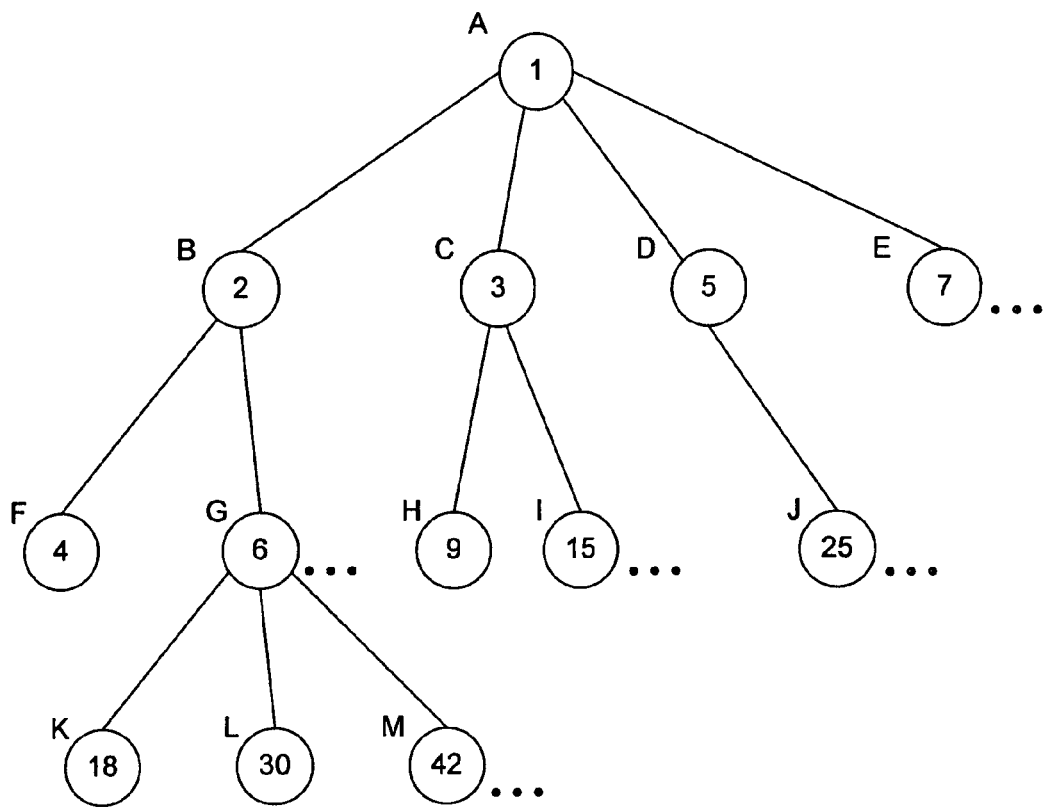
FIG. 3A is a first example of an address allocation tree system corresponding to addresses allocated by the prime numbering address allocation method.

FIG. 2 illustrates a flowchart of a prime numbering address allocation method in a wireless multi-hop network, and FIG. 3A is an example of an address allocation tree structure corresponding to addresses allocated by the method. Consistent with the present invention, each host is configured as a DHCP proxy, so that all hosts are eligible to assign addresses and a new host can acquire an address from its neighbors.

To allocate a unique address to a new host, as shown in FIG. 2 and FIG. 3A, if the new host is a first host A joining a wireless multi-hop network, the host A is the root of a tree with address 1 (step S21). If the new host is attached to the root host, the root host (host A) allocates a prime number, sequentially following the prime number previously allocated by the root host, to the new host (step S22). That is, the root host (host A) can allocate all prime numbers sequentially to new hosts attached to it, and thus, as shown in FIG. 3A, the hosts B, C, D, E, . . . attached to the root host are sequentially assigned with addresses {2, 3, 5, 7 . . . }. Host A is the parent of hosts B, C, D, E, . . . , and, correspondingly, hosts B, C, D, E, . . . are children of host A. If the new host is attached to a non-root host (a host that is not the first one joining the network), the non-root host allocates an address to the new host (step S23), wherein the allocated address is the address of the non-root host multiplied by a prime number which starts from the largest prime factor of the address of the non-root host and sequentially follows to the previous one allocated by the non-root host. That is, the non-root host can allocate addresses as its own address multiplied by a prime number which starts from the largest prime factor of its own address. Accordingly, as shown in FIG. 3A, for the host B with address {2}, the largest prime factor of 2 is 2, so the order of addresses it can assign to hosts F, G, . . . is {2*2=4, 2*3=6, . . . }, in which host B is the parent of hosts F, G, . . . , and, correspondingly, hosts F, G, . . . are children of host B. Similarly, for the host (G) with address {6}, the largest prime factor of 6 is 3, so the order of addresses it can assign to hosts K, L, M, . . . is {6*3=18, 6*5=30, 6*7=42, . . . }, in which host G is the parent of hosts K, L, M, . . . , and, correspondingly, hosts K, L, M, . . . are the children of host G. Based on this prime address allocation process, each address can only be generated by a single host. Further, each host can determine the address of its parent host by dividing its address by the largest prime factor of its address.

Figure 4A:
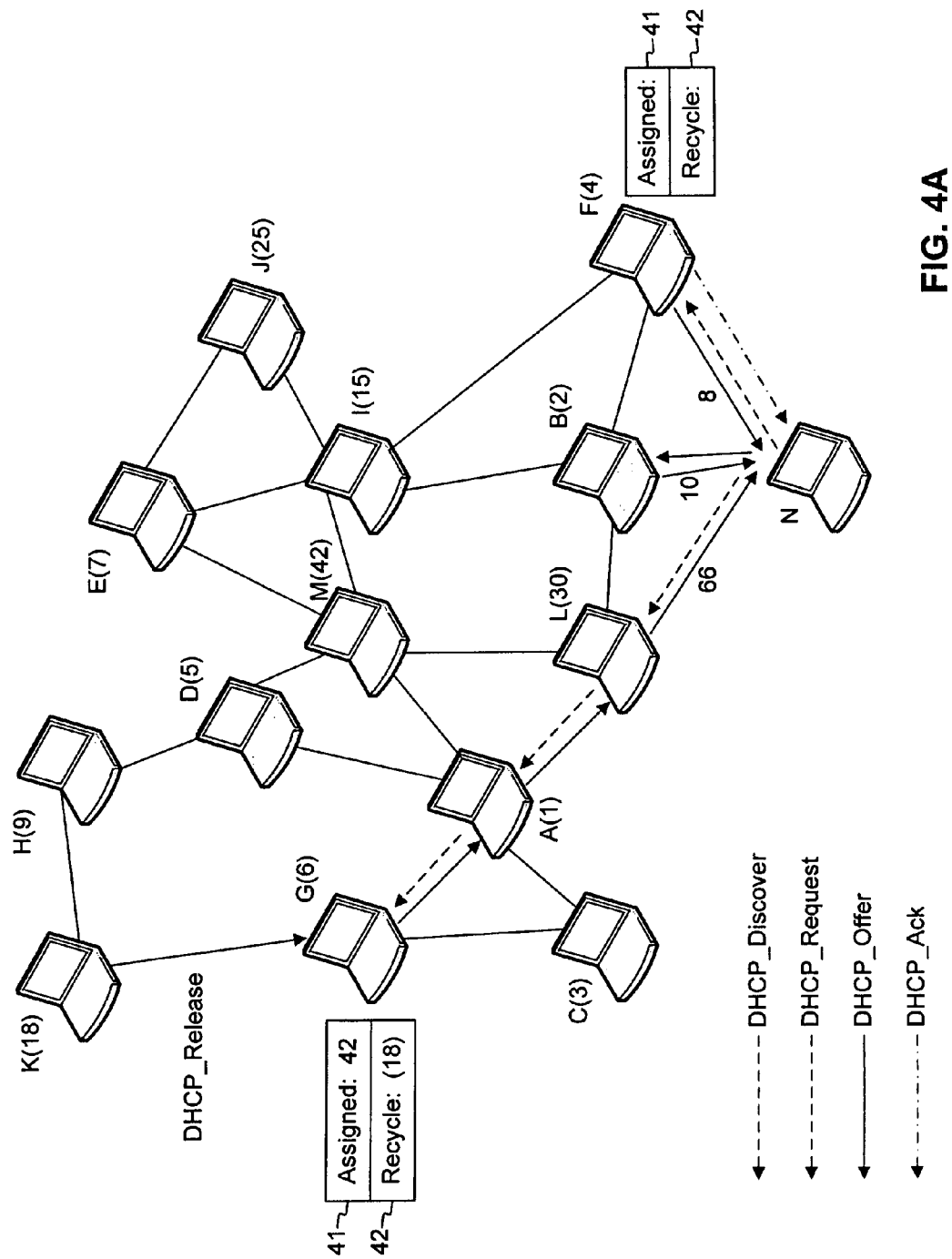
FIG. 4A is a diagram that illustrates an exemplary network topology with an address space of 128 for hosts shown in FIG. 3A.

Based on the prime numbering address allocation method of FIG. 2, a logical address allocation tree, as shown in FIG. 3A, can be established to allocate a unique address to each host. In practice, each host can move around in a multi-hop wireless network and/or leave the network after being allocated an address. As a result, the neighboring relationship in the logical address allocation tree may differ from that of the real network topology. FIG. 4A illustrates an exemplary network topology with an address space of 128 for hosts shown in FIG. 3A, and illustrates message flows of the prime numbering DHCP. These messages can be carried by any routing protocol in the wireless multi-hop network. Each host in the network is provided with an address record 41 for recording the addresses that have been allocated by this host, and a recycle list 42 for recording addresses that have been previously allocated, but that are not currently allocated, by this host.

Figure 4B:
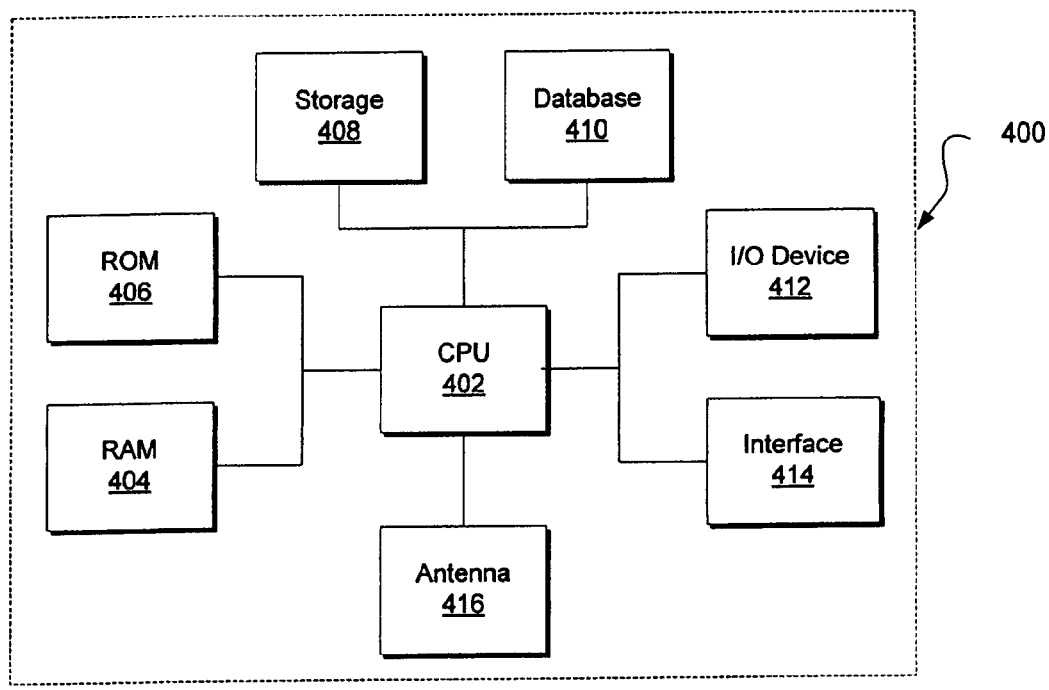
FIG. 4B is a block diagram of an exemplary host of the type shown in FIG. 4A.

FIG. 4B illustrates an exemplary structure 400 of any one of the hosts shown in FIG. 4A. With reference to FIG. 4B, host 400 may include one or more of the following components: at least one central processing unit (CPU) 402 configured to execute computer program instructions to perform various processes and methods, random access memory (RAM) 404 and read only memory (ROM) 406 configured to access and store information and computer program instructions, memory 408 to store data and information, one or more databases 410 to store tables, lists, or other data structures, one or more I/O devices 412, one or more interfaces 414, one or more antennas 416, etc. Each of these components is well-known in the art and will not be discussed further.

Figure 5:
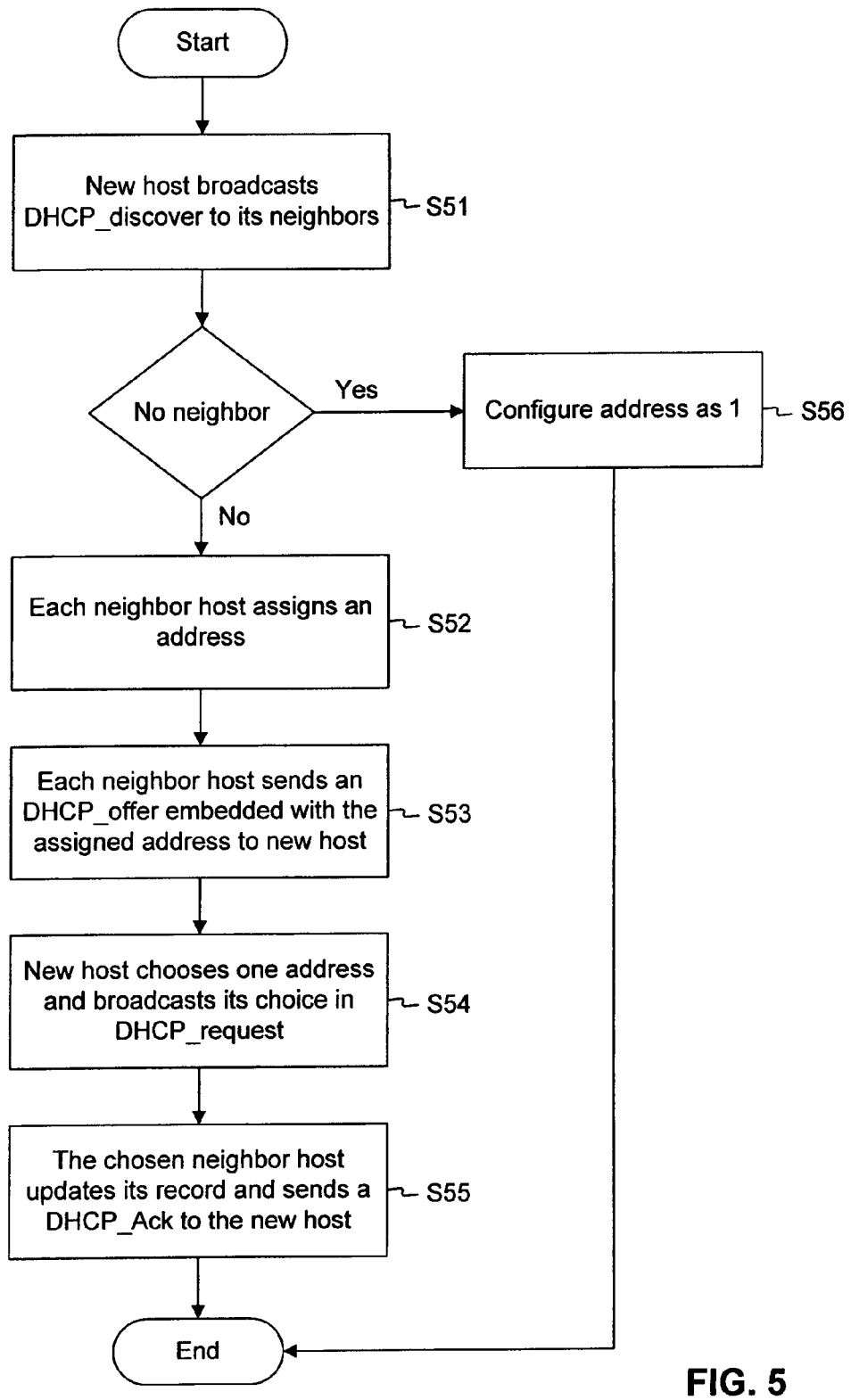
FIG. 5 illustrates a flowchart of a method for acquiring an address for a new host in accordance with a numbering address allocation method in a wireless multi-hop network consistent with embodiments of the present invention.
Figure 6:
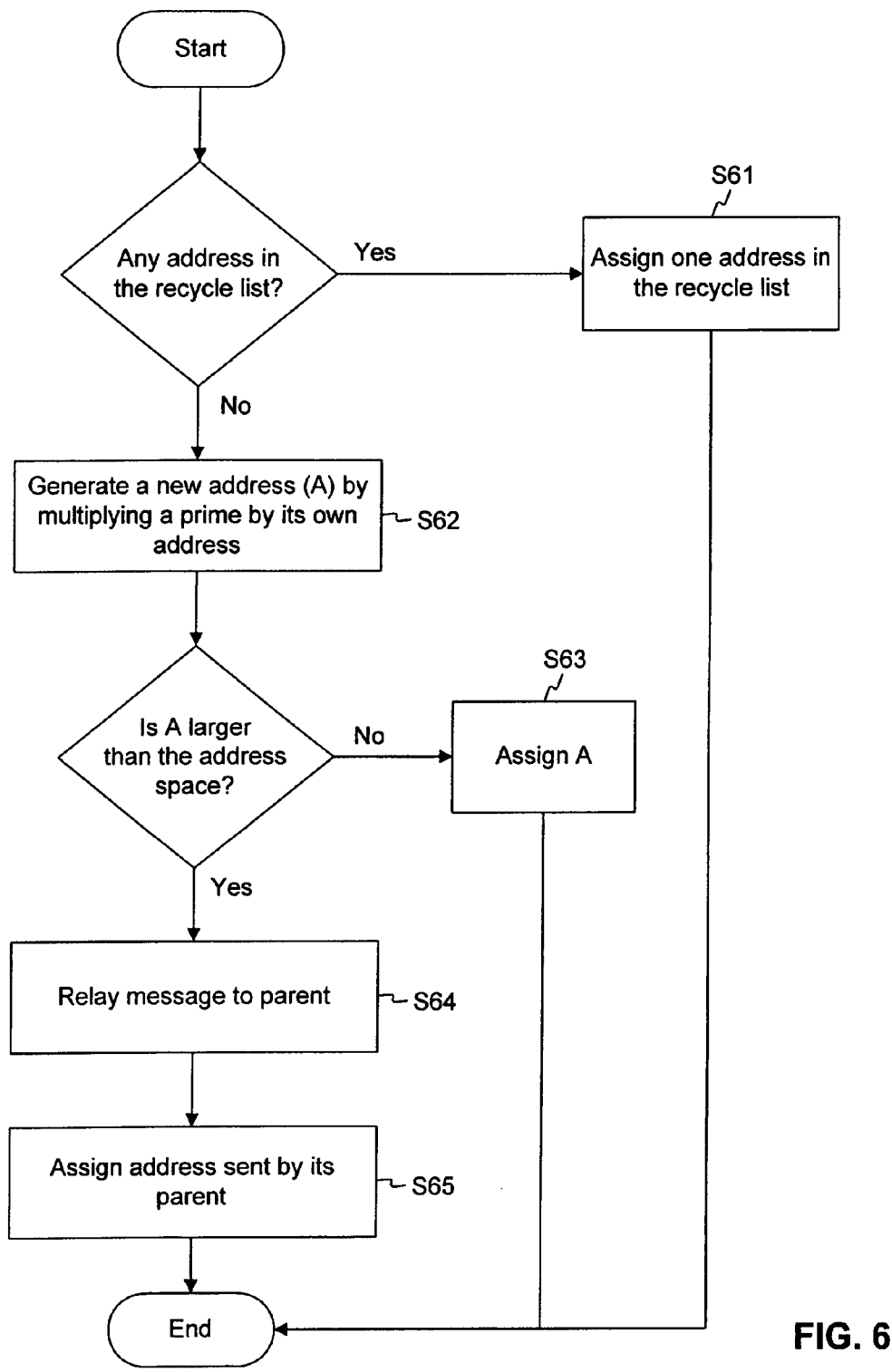
FIG. 6 illustrates a flowchart of a method for assigning an address to a new host in accordance with the numbering address allocation method in a wireless multi-hop network consistent with embodiments of the present invention.

FIG. 5 illustrates a flow chart of a method for acquiring an address for a new host. As shown in FIGS. 4A and 5, when a new host N joins the network, it broadcasts a message for discovering neighbors (for example, DHCP_Discover request message) to its neighbor hosts (Step S51), as defined in DHCP. If there is no neighbor host, and thus no response is received, it is known that the new host N is the root and is configured with an address of 1. Otherwise, as in this example, upon receiving the request from the new mobile host N, each of the neighbor hosts L, B, and F does not forward the message to the whole network and instead assigns an address according to the prime numbering address allocation method (Step S52). FIG. 6 further illustrates a flow chart of a method for assigning an address, based on the above described prime numbering address allocation method, in which the neighbor host assigns the smallest address in its recycle list 42 if there are addresses in the recycle list (Step S61). If there is no address in the recycle list 42, the neighbor host generates an address (A) by multiplying a prime number by its own address (step S62), and if this generated address (A) is not larger than the address space, this address (A) is assigned by the neighbor host (Step S63); otherwise, the DHCP_Discover request message is relayed to its parent (Step S64) and the parent host assigns an address (Step S65). In this example, assuming that the neighbor hosts L, B, F do not have any address in their recycle lists, neighbor host F (with address=4) assigns an address=4×2=8, neighbor host B (with address=2) assigns an address=2×5=10, and neighbor host L (with address=30) assigns an address=30×5=150. Here, host B multiplies its address by 5 because it previously multiplied its address by 2 and 3 to assign addresses to hosts F and G (FIG. 3A), respectively, and 5 is the next prime number. With regard to the address assignment by host L, the address=150 generated by neighbor host L is larger than the address space 128. Therefore, neighbor host L sends the DHCP_Discover request message to its parent host G (FIG. 3A) for help and the parent host G generates an address=6×11=66 for neighbor host L.

Referring again to FIG. 5, after assigning an address, each of the neighbor hosts L, B, F sends a message offering the address (for example, DHCP_Offer message), i.e., embedded with such address 66, 10, 8, to the new host (N) (Step S53). Therefore, host N receives three DHCP_Offer messages with three available addresses, 66, 10, and 8 from hosts L (or G), B, and F, respectively. It is noted that if host N receives no response (i.e., DHCP_Offer message), the host N is known to be the root host and is assigned an address 1. After receiving the three DHCP_Offer messages, host N chooses one of the addresses and broadcasts its choice in a DHCP_Request message (step S54) to notify the chosen host of successful address allocation. Preferably, host N chooses the smallest address 8 to prevent the tree from growing too fast. Its neighbor hosts L, B, and F stop forwarding the DHCP_Request messages, except the message relayed to parent host G by host L. Finally, the chosen host F updates its address record 41 and sends an acknowledge message (for example, DHCP_Ack message) to host N for confirmation (step S55). Consequently, the illustrated method enables sending DHCP_Offer and DHCP_Request messages by one-hop broadcasting instead of whole-network broadcasting.

In order to avoid an address leak problem, a host should perform a graceful departure, which means it should release its address when it is going to leave the network or shutdown. For example, it is assumed that host K in FIG. 4A is leaving, so host K sends a message releasing its address (for example, DHCP_Release message) to its parent host G. Host G then records the address 18 in its recycle list 42, and the addresses in the recycle list 42 will have higher priority to be assigned later. If the root is going to leave, it should inform its greatest descendent, which has the largest allocated address in the network, to be the root. For example, the host M is the greatest descendent of the root host A in FIG. 3A.

In wireless communication networks, a radio-link may break or a mobile host may leave gracelessly, e.g., a radio-link is broken without sending a DHCP_Release message. To deal with such events, each host sets a timer which starts to count down when the sending host sends a message (which can be any message except the DHCP_Release message) to a destination host. If the timer expires and no response is received, the destination host is deemed to be a graceless-departure host. For those hosts leaving gracelessly, their addresses can be recycled by their parent hosts after the DHCP lease time, but they may become not recyclable if their parent hosts leave the network also. Therefore, in one embodiment, root host A periodically broadcasts a message for recycling (for example, a DHCP_Recycle message) to request all hosts to send their current status, including assigned addresses and the recycle list. By gathering statuses of existing hosts, the root host A can reconstruct the address allocation tree, and send to the hosts their new recycle lists including graceless-departure hosts. The broadcasted DHCP_Recycle message can be piggybacked in the message of routing protocol, DSDV for example, so that no additional overhead will be incurred for address recycle.

In accordance with another embodiment, a source host configures a routing path to any destination host without an exchange of routing information between hosts in the network. Instead, the source host uses its own address along with the destination address of the destination host to determine the address of their least common ancestor. This least common ancestor host is the first shared parent host encountered in traversing up the network tree from both the source and destination hosts. Once the least common ancestor host is identified, the routing path can be configured into two segments, from the source host to the least common ancestor host, and then to the destination host. For example, with reference to an address allocation tree system example shown in FIG. 3B, assuming that the source host is P and the destination host is Q, then the least common ancestor is host F.

Figure 7:
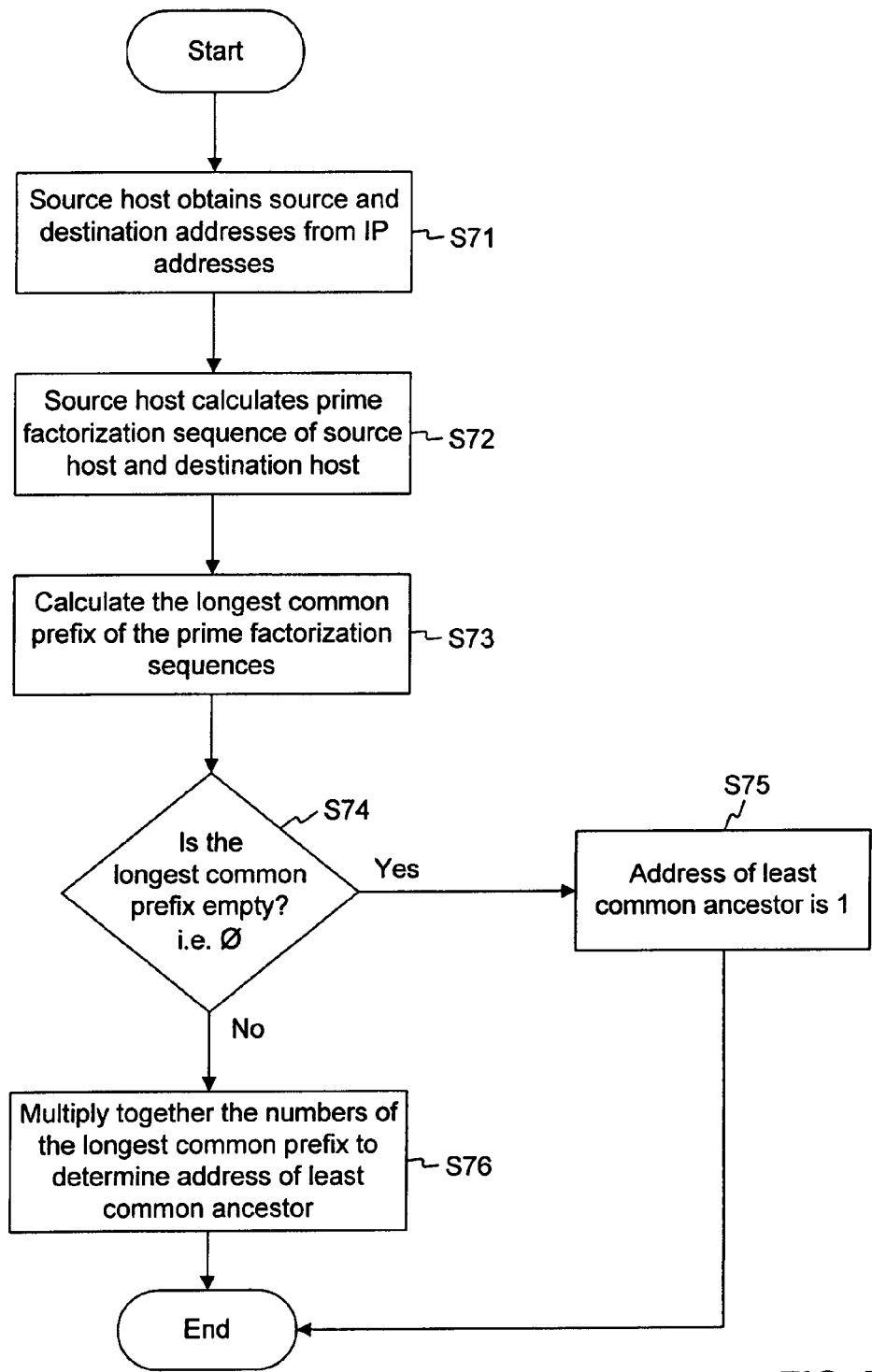
FIG. 7 illustrates a flowchart for calculating a least common ancestor node.

FIG. 7 illustrates a flowchart of a method by which the source host determines the address of the least common ancestor host. Initially, the source host obtains the IP addresses of itself and of the destination host (S71), and from that information obtains the source and destination addresses. The source and destination addresses may be portions of the IP address, specifically the sub-network, that the source host extracts. For example, if the IP address of the source host P is 10.51.100.16, then the source host address could be 16. In addition, if the IP address of the destination host Q is 10.51.100.36, then the destination host address could be 36. One of ordinary skill in the art will now recognize that there are several ways to determine source and destination addresses from an IP address including, but not limited to, use of a correlating table, or running a mathematical algorithm on the IP address.

Once the source host successfully obtains the source and destination addresses, it proceeds to calculate the prime factorization sequence of each (S72). This involves completely factoring each address of the source and destination so that all of the numbers in that sequence, when multiplied with each other, yield the original address. The prime factorization sequence can be modeled by the following mathematical algorithm: $pfSeq(n) = (p_0, p_1, p_2 \ldots p_m)$ where $p_i \leq p_j \forall i < j$ and $$\prod_{i=0}^{m} p_i = n.$$

Continuing with the previous example, the prime factorization of source host P would be done by fully factoring its address of 16, which would be $pfSeq(16) = (2, 2, 2, 2)$. Note that 2 is a prime number that cannot be factored any further, and that $2 \times 2 \times 2 \times 2 = 16$, which is the address of source host P. Similarly, the prime factorization of destination host Q would be $pfSeq(36) = (2, 2, 3, 3)$.

Once the prime factorization sequences for the source and destination host addresses have been calculated, the source host then calculates the longest common prefix of those prime factorization sequences (S73). To calculate the longest common prefix, the source host takes both prime factorization sequences, (here $pfSeq(16) = (2, 2, 2, 2)$ and $pfSeq(36) = (2, 2, 3, 3)$), and compares each number within the sequences starting from the beginning of the sequence. For example, the source host would determine that the first item in pfSeq(16) is 2, and that the first item in pfSeq(36) is 2. Therefore, 2 is the first matching prefix. Then the source host would determine that the second item in pfSeq(16) is 2, and that the second item in pfSeq(36) is 2. Therefore, 2 is the second matching prefix. Then the source host would determine that the third item in pfseq(16) is 2, and that the third item in pfSeq(36) is 3. Since these numbers are different, there are no more matching prefixes. Therefore, the longest matching prefix is the first matching prefix and the second matching prefix, which is (2, 2). If there were no matching prefixes at all, that is, if the longest common prefix was an empty set (S74, Yes), then the least common ancestor is the root host, whose address is 1 (S75).

In this example, the longest common prefix is not the empty set (S74, No), it is (2, 2). To determine the address of the least common ancestor host, the source host multiplies together the elements of the longest common prefix (S76) which results in the greatest common divisor (GCD) of the source address of 16, i.e., its own address, and the destination address of 36. In this case, the GCD is $2 \times 2 = 4$. Therefore the least common ancestor host has an address of 4, which corresponds to host F (see FIG. 3B).

Once the least common ancestor host is identified, the source host can configure the routing path into two segments: a first segment from itself to the least common ancestor host, and a second segment from the least common ancestor host to the destination host. In one embodiment, the hosts involved use a stateless routing protocol. In this protocol, the hosts do not need to record any data, but the routing paths may be longer. In another embodiment, the hosts use a stateful routing protocol. In this protocol, the hosts need to record the addresses of their neighbors, but shorter paths are available. The stateless and stateful routing protocols are described more fully below.

One embodiment of the stateless routing protocol is a source routing method, in which the source host is responsible for setting up an entire routing path. Another embodiment of the stateless routing protocol is a hop-by-hop routing method, in which each host along the way from the source host to the destination host finds the next host in the path to the destination host on its own.

Figure 9:
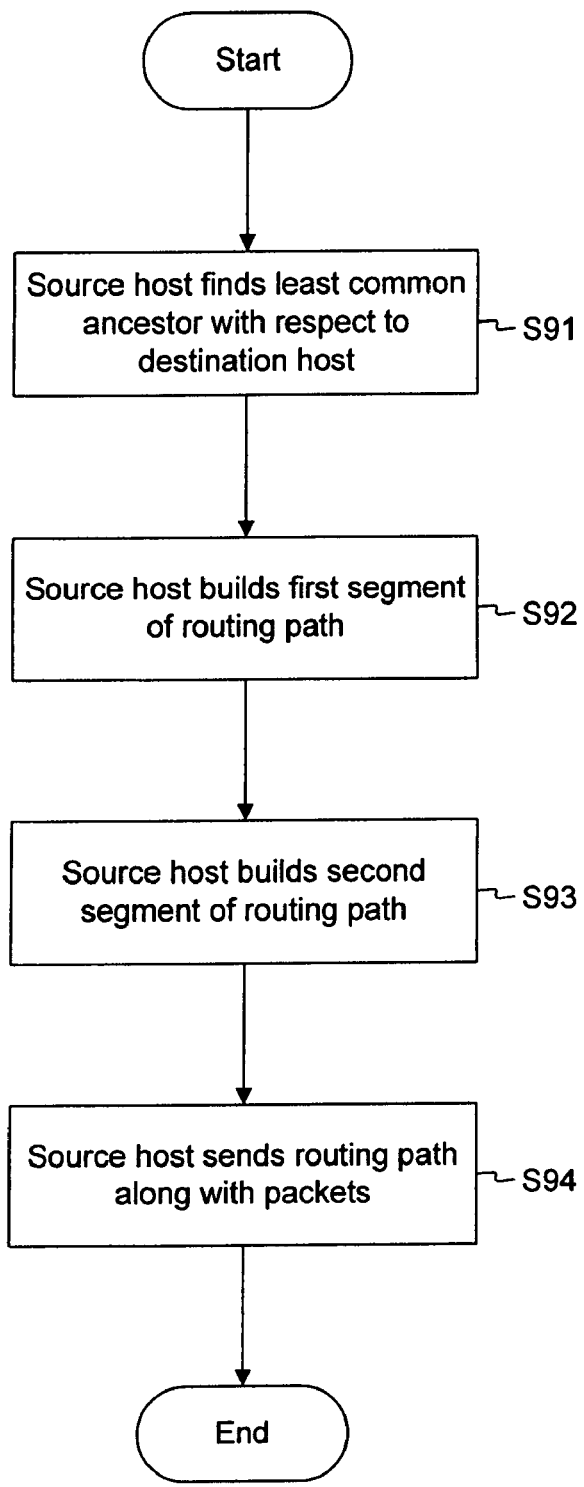
FIG. 9 illustrates a flowchart for implementing the source routing method.

FIG. 8 shows pseudocode for the source routing method, in accordance with the stateless routing protocol, in which the source host (src) finds the entire routing path to the destination host (dst). FIG. 9 illustrates a flowchart for implementing the source routing method. With reference to FIG. 9, the source host first finds the least common ancestor host with respect to the destination host (S91) by the previously described method (FIG. 7). Using the tree structure of FIG. 3B for the present example, the source node P has an address of 16, the destination node Q has an address of 36, and the least common ancestor host is F with an address of 4.

The source host then builds the first segment of the routing path by recursively adding parent hosts to a routing list until the least common ancestor host is reached (S92). The parent host of any particular host can be calculated by dividing its own address by the largest prime factor of its own address. For example, the parent host for source host P is 16/2=8, which corresponds to host N. Accordingly, the first entry in the routing list is 8. Since 8 does not correspond to the least common ancestor host, source host P adds the next parent host to the source list, which is the parent host of host N (address 8). The parent host of 8 is calculated by dividing the address of its parent host by the largest prime factor of its own address. Thus, the source host performs 8/2=4, which is appended onto the routing list, which is now (8, 4). Host 4 does correspond to the least common ancestor host F, and, therefore the first segment of the routing list is complete. Lines 1-7 of the pseudocode in FIG. 8 correspond to steps S91 and S92 in FIG. 9.

Next, the source host builds the second segment of the routing path in which it adds child hosts to the routing list instead of parent host as was done in the first segment (S93). In doing so, the source host first calculates the prime factorization sequence (as described earlier) using the destination host address divided by the least common ancestor host address. In the present example, this would be the prime factorization sequence of the result of dividing 36 (the destination host Q) by 4 (the least common ancestor host) which is 9. The prime factorization sequence of 9 is pfSeq(9)=(3, 3). The source host recursively steps through this calculated prime factorization sequence to calculate the second segment of the routing list. In this example, the source host multiplies the least common ancestor host address of 4 with the first element in the calculated prime factorization sequence, which is 3, to calculate the next host after the least common ancestor host in the routing list, which is 4×3=12, corresponding to host O. This address is appended to the routing list, which is now (8, 4, 12). Next, the source host multiplies the most recently added O host (address of 12) by the second element in the calculated prime factorization sequence, which is 3, to yield the final host in the routing list. More particularly, this multiplication yields 12×3=36, which corresponds to host Q and this address is appended to the routing list, which becomes (8, 4, 12, 36). The second segment of the routing protocol is now complete because the destination host Q has been reached and, furthermore, there are no more elements in the prime factorization sequence available. The source host can send this routing list along with the data that it is sending, for example in a header, so that each host along the route knows where to route the data (S94). Lines 8-17 of the pseudocode in FIG. 8 correspond to steps S93 and S94 in FIG. 9.

FIG. 10 shows pseudocode illustrating the hop-by-hop routing method in accordance with the stateless routing protocol. In the hop-by-hop method, each current host with address cur individually computes the next host to which to send the data based on the destination host with address dst. While this method may increase the computational load of each host as compared to the source routing method, there is less overhead since there is no need to send a routing list with the data.

Figure 11:
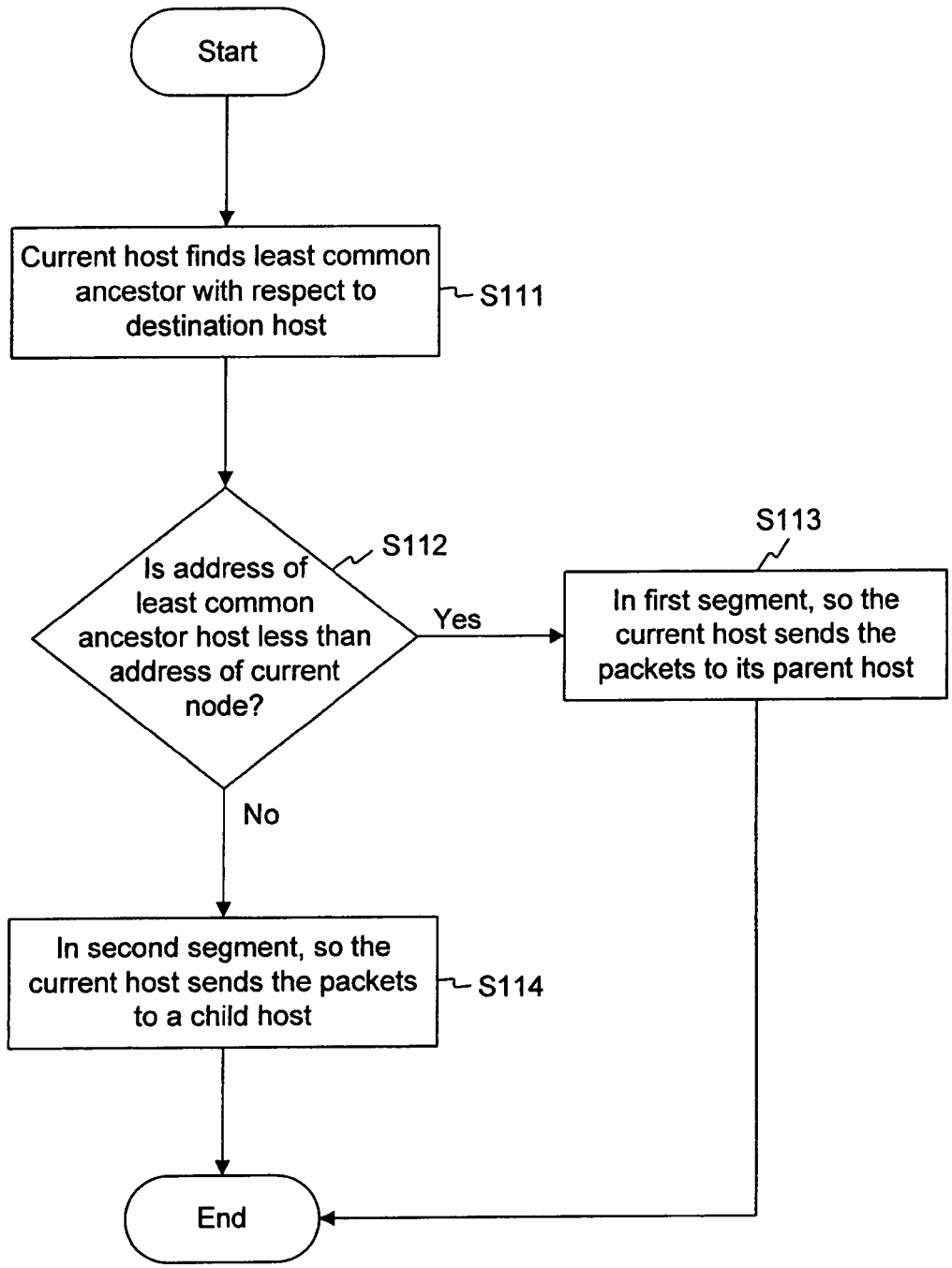
FIG. 11 illustrates a flowchart for implementing the hop-by-hop routing method.

FIG. 11, illustrates a flowchart for implementing the hop-by-hop method. With reference to FIG. 11, the current host first calculates the least common ancestor host between itself and the destination host (S111) by the method previously described (FIG. 7). If the address of the least common ancestor host is less than its own address (S112, Yes), then the current host knows that it is in the first segment of the routing path. Accordingly, it sends the packet to its own parent, using the previously described method (S113). This sequence of operations from S111 to S113 corresponds to lines 1-4 of the pseudocode in FIG. 10.

If, instead, the address of the least common ancestor host is greater than or equal its own address (S112, No), the current host is in the second segment of the routing path and sends the packets to one of its child hosts (S114). The current host determines which child host to send the packets to by first dividing the address of the destination host by its own address and calculating the prime factorization sequence of the result of that division, as described above. Then, the current host takes the smallest element in the calculated prime factorization sequence and multiplies it by its own address. The result is the child host to which the current host sends the data. The sequence of operations from S112 to S114 corresponds to lines 5-8 of the pseudocode in FIG. 10.

Once the current host sends the data to the next host (either the parent or a child host), that next host becomes the current host, and the method repeats until the destination host is reached.

Figure 3B:
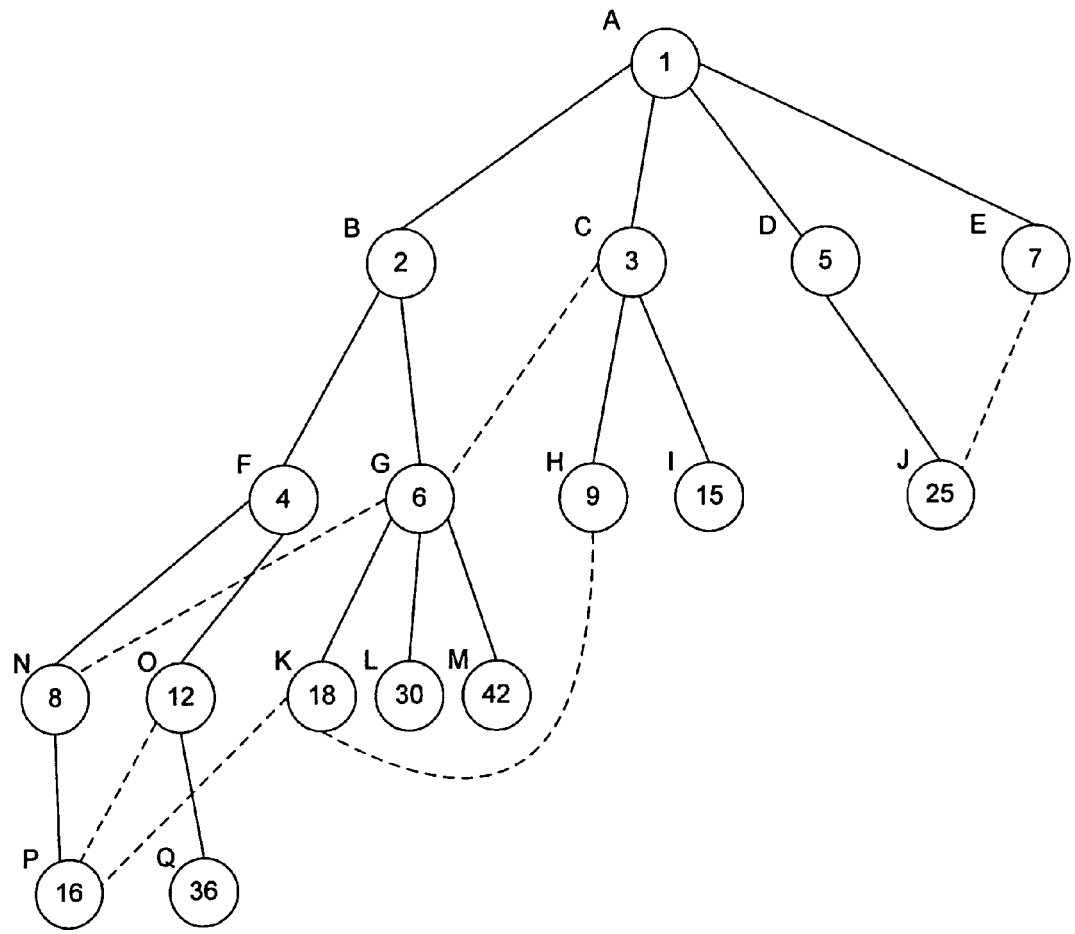
FIG. 3B is second example of an address allocation tree system corresponding to addresses allocated by the prime numbering address allocation method.

Continuing with the previous example shown in FIG. 3B, source host P calculates that the least common ancestor host of itself and destination host Q is host F (S111). Since F's address of 4 is less than P's address of 16, P knows that the routing path is currently in the first segment (S112, Yes), and accordingly sends the data to its parent host N(S113). Least common ancestor host F's address of 4 is also less than host N's address of 8 (S112, Yes), and so host N similarly forwards the data to its parent, host F (S113). Host F calculates that its address of 4 is greater than or equal to the least common ancestor host address of 4 (it is the least common ancestor host), (S112, No) and so it knows that it is in the second segment of the routing path and must send the data to a child host (S114). To calculate the correct child host, host F first divides the destination host address by its own address, to yield 36/4=9. Next, host F calculates the prime factorization sequence of 9, which is pfSeq(9)=(3, 3). Next, host F chooses the smallest element on that calculated prime factorization sequence of 9, which is 3. Finally, host F multiplies this smallest element by its own address to yield the appropriate child host address of 4×3=12, which corresponds to host O. Accordingly, host F forwards the data to host O. Host O similarly calculates that it is in the second segment of the loop and performs calculations similar to those of host F to obtain the child host address of 36 to which it should send the data. Host F therefore forwards the data to address 36, corresponding to host Q, which is the final destination.

Although the stateless routing protocols described above can configure routing paths without recording any information, the routing paths may be long because the hosts only calculate the routing path using the branches of the address allocation tree. There are additional links, examples of which are shown as dashed lines in FIG. 3B, that do not belong in the address allocation tree. As discussed above, when a new host is added, it can be connected to several hosts, but is only addressed by one host, which becomes its parent host. Therefore, there may be additional links available in the network that are not mapped by the address allocation tree. The stateful routing protocol uses one or more of these additional links to calculate a shorter route.

In the stateful routing protocol, each host records the addresses of its neighbors, and is therefore aware of its local topology. Accordingly, the stateful routing protocol uses a hop-by-hop method in which each host calculates only the next hop.

Figure 13:
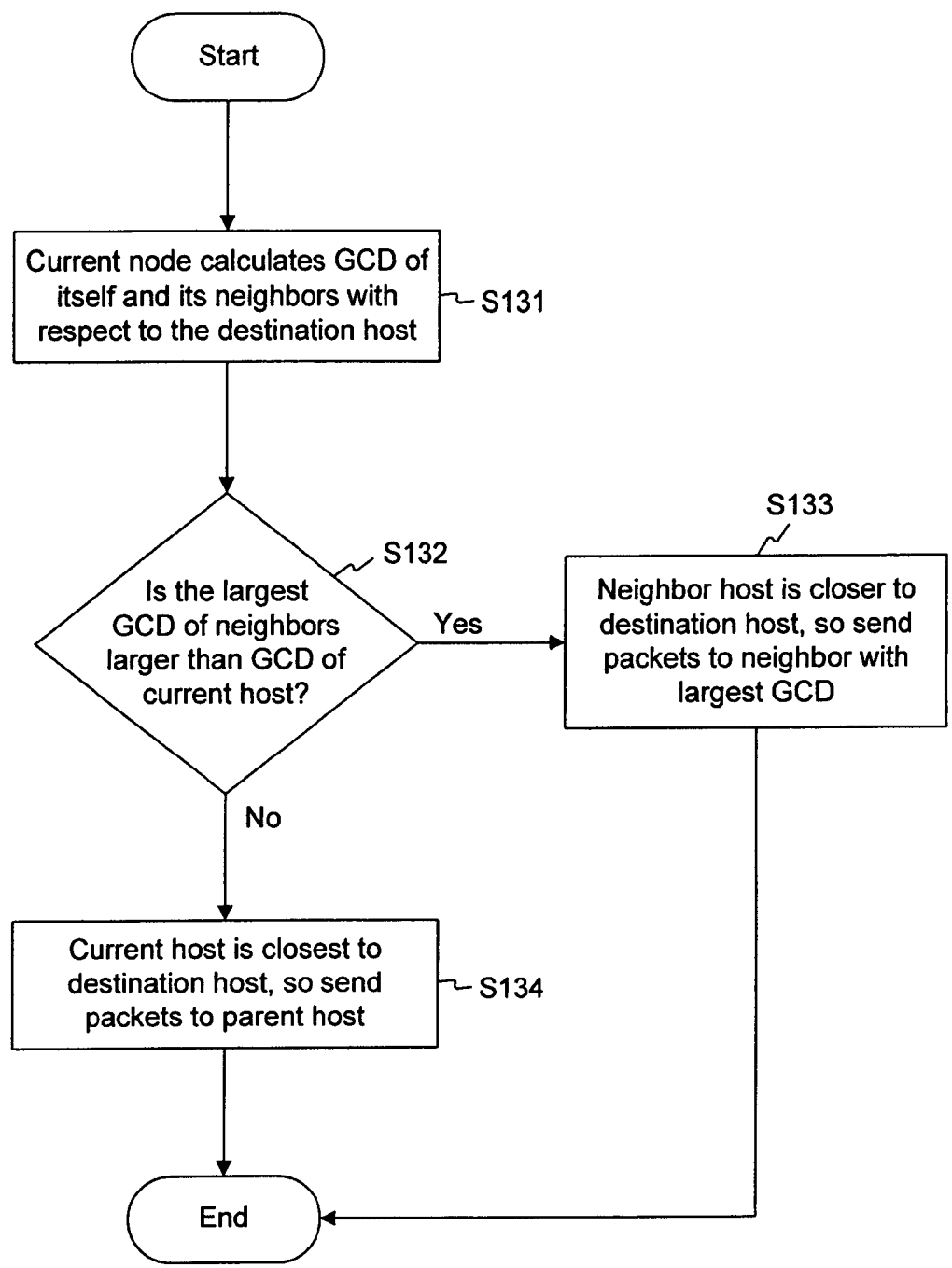
FIG. 13 illustrates a flowchart for implementing the stateful hop-by-hop routing protocol.

FIG. 12 shows pseudocode for the hop-by-hop method in accordance with the stateful routing protocol. FIG. 13 illustrates a flowchart for implementing this hop-by-hop method. With reference to FIG. 13, a current node first calculates the greatest common divisor (GCD) for itself and all of its neighbors with respect to a destination host (S131). As described previously, the GCD is calculated by multiplying together the elements from the longest common prefix. Lines 1-5 of the pseudocode in FIG. 12 correspond to step S131. The current host then checks whether the largest GCD value of its neighbors is larger than its own GCD. If this is true (S132, Yes), then the neighbor host with the largest GCD is closer to the destination than the current host and the other neighbor hosts. Accordingly, the current host sends the data to the neighbor with the largest GCD (S133). Lines 6-7 of the pseudocode correspond to steps S132-Yes and S133. If, instead, the current host has the largest GCD among its neighbors (S132, No), the current host sends the data to its parent host (S134). Lines 8-10 of the pseudocode correspond to steps S132-No and S134.

Continuing with the previous example shown in FIG. 3B, source host P first calculates the GCD of itself and its neighbors N, O, and K with respect to the destination host Q (S131). The GCD of itself is 4, of host N is 4, of host O is 12, and of host K is 2. Therefore, the closest host to destination host Q is host O, since its GCD with respect to host Q is larger than any other host connected to P (S132, Yes). Accordingly, host P sends the data directly to host O (S133). Host O then calculates the GCD of itself and all of its neighbors with respect to destination host Q (S131). The GCD of O is 12, of F is 4, of P is 4, and of Q is 36. Therefore the host Q has the largest GCD (S132, Yes), and host O sends the data to host Q (S133), which is also the destination, and thus the routing is complete. Using this methodology, the number of hops to get from P to Q is 2, whereas in the stateless routing protocol, the number of hops is 4.

As will now be appreciated by those with ordinary skill in the art, embodiments of the present invention can be implemented in multiple ways. For example, one embodiment can be implemented in a wireless mesh network.

Another embodiment can be implemented in a wireless sensor network. In this embodiment, sensor nodes collect data and route it to a sink node within the sensor network. This sink node may be the root host with responsibility for assigning addresses to all other sensor nodes. In accordance with embodiments consistent with the present invention, sensor nodes can compute routing paths to other sensor nodes or to the sink node.

Figure 14:
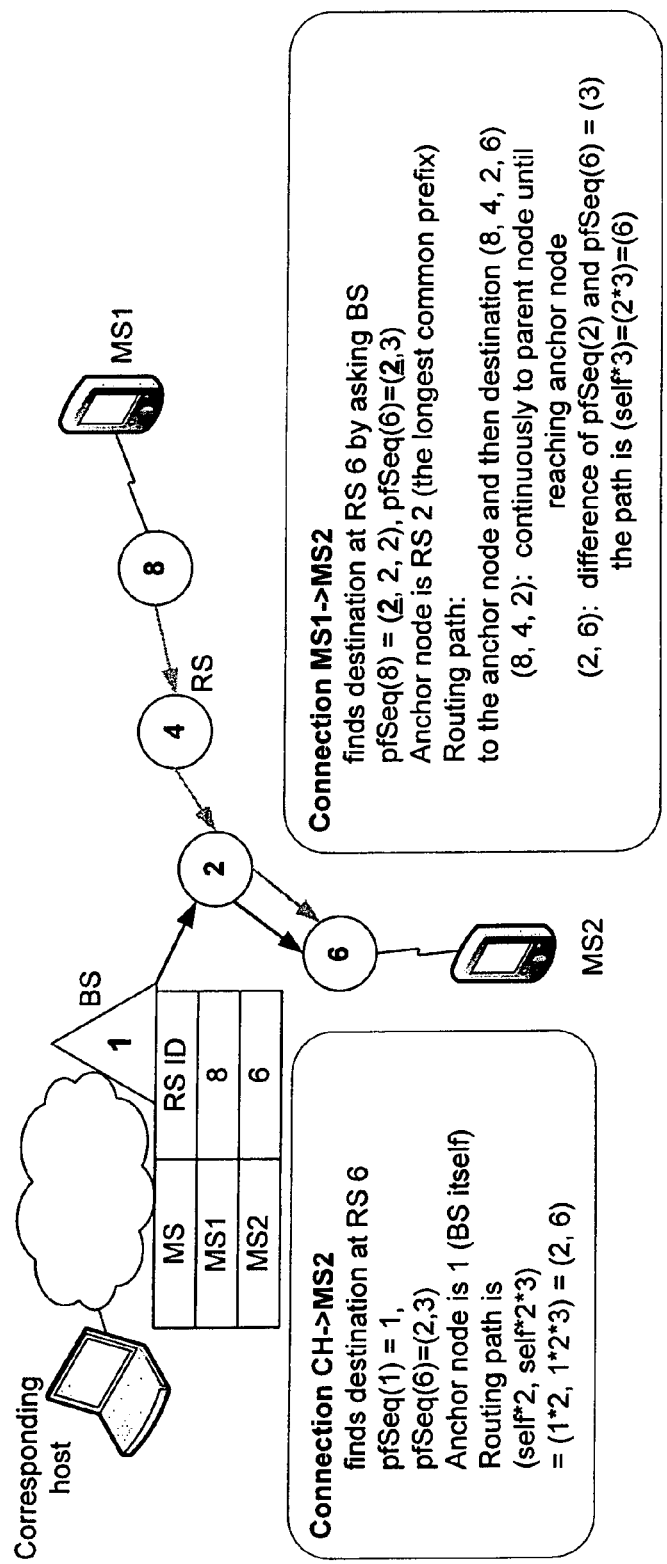
FIG. 14 illustrates a WiMAX network consistent with embodiments of the present invention.

An embodiment can be implemented in a WiMAX wireless communication network, which is a type of mobile multi-hop relay based (MMR) network. The WiMAX network comprises a base station and one or more relay stations connecting to one or more mobile subscribers to extend the range of the network and/or to enhance throughput, etc. In this embodiment, the WiMAX base station or anchor node may be the root host, which can assign addresses to the relay stations. In this way, the relay stations and the base stations can route data to any other station without the exchange of routing information. FIG. 14 illustrates two examples of this embodiment. In one example, a corresponding host (CH) is situated outside of the MMR network and communicates with a mobile subscriber (MS1) inside the MMR network. In a second example, sending and receiving mobile subscriber hosts (MS1, MS2) that are both situated within the MMR network communicate with each other. Both of these examples from FIG. 14 show the stateless routing protocol source routing method, in accordance with FIGS. 8 and 9.

Figure 15:
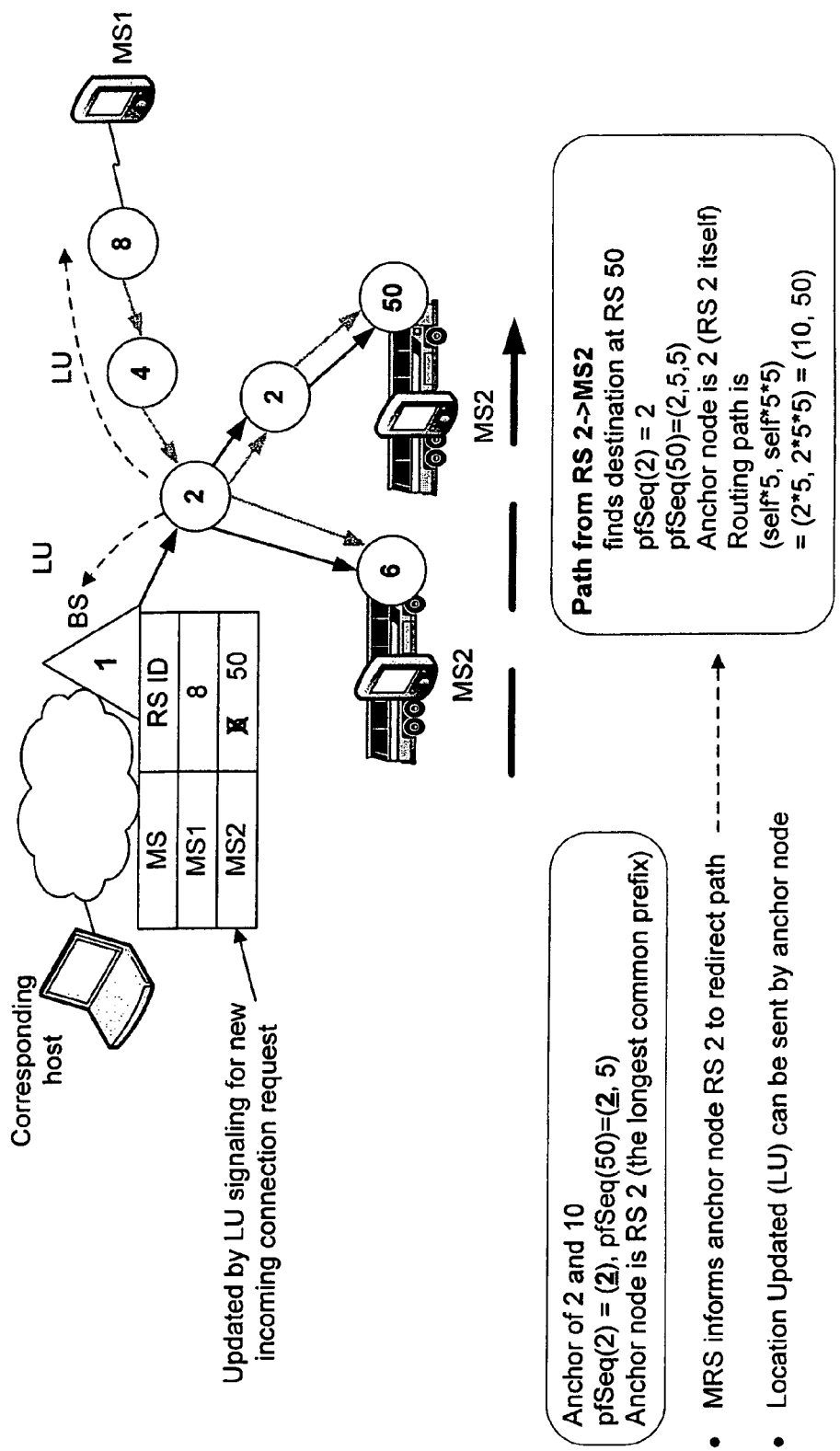
FIG. 15 illustrates a mobile relay station handover consistent with embodiments of the present invention.

In yet another embodiment, the MMR network, in addition to relay stations as described above, further comprises mobile relay stations (MRS). These MRS are connected to the network through relay stations, and provide network connectivity to mobile subscribers. Since the MRS are mobile devices that require connectivity to fixed relay stations, it may be necessary to handover an MRS from one relay station to another as a result of movement by the MRS. For example, FIG. 15 shows an MRS deployed on a bus so that mobile subscribers (MS) on the bus have internet access while traveling. While the bus is traveling, it may become necessary to switch between different fixed relay stations as the bus moves into different coverage areas. To do so, the MRS first decides that there needs to be a handover from its original relay station (RS) to a target relay station. In FIG. 15, the target relay station address is RS 10 and the original relay station address is RS 2. Next, the MRS follows methods previously described to calculate the least common ancestor between the original relay station RS 2 and the target relay station RS 10 which, in the current example, is RS 2. The MRS then executes the handover to the target relay station RS 10, and acquires a new identification (address) of 50 by the method previously disclosed. Then, the MRS informs the least common parent, relay station RS 2, to redirect data traffic for the particular MRS to its new address identification 50. Finally, the least common ancestor, relay station RS 2, sends a location update (LU) message to update the location mappings recorded in the base station and in the sender, if the sender is also within the same network. By completing this process, a mobile handover can be successfully conducted.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A method for routing data, using a stateless routing protocol, between a source host and a destination host in a network including a plurality of hosts, wherein each of the hosts has a unique numerical address, the method comprising:
   determining a least common ancestor host of the source host and the destination host using the unique numerical address of each of the source and destination hosts, the determining further comprising:
      calculating a first prime factorization sequence for the source host numerical address;
      calculating a second prime factorization sequence for the destination host numerical address; and using the first and second prime factorization sequences to calculate a least common ancestor host unique numerical address by a greatest common divisor (GCD) calculation;

sending the data from the source host to the least common ancestor host;

sending the data from the least common ancestor host to the destination host; and processing the data at the destination host.

2. The method of claim 1, wherein using the first and second prime factorization sequences further comprises:

comparing the first and second prime factorization sequences to determine a longest common prefix; and calculating the least common ancestor host unique numerical address by multiplying together all numbers in the longest common prefix.

3. The method of claim 1, wherein the stateless routing protocol is implemented using source routing.

4. The method of claim 3, further comprising:

building a first route segment from the source host to the least common ancestor host by recursively adding parent hosts to a route list;

building a second route segment from the least common ancestor host to the destination host by calculating a prime factorization sequence of a result of dividing the unique numerical address of the destination host by the unique numerical address of the least common ancestor host, to add any further host to the route list.

5. The method of claim 1, wherein the stateless routing protocol is implemented using hop-by-hop routing.

6. The method of claim 5, wherein a current host in the network receives data to send to the destination host, the current host:

determining whether or not it is in a first or a second route segment;

sending the data to a parent host if it determines that it is in the first route segment;

sending the data to a child host if it determines that it is in the second route segment; and wherein the child host is selected using a prime factorization sequence of a result of dividing the unique numerical address of the destination host address by the current host address.

7. A system for routing data between a plurality of networked hosts with unique numerical addresses using a stateless routing protocol, the system comprising:

a sending host adapted to:

determine a least common ancestor host using the unique numerical address of each of the source and destination hosts, by:

calculating a first prime factorization sequence for the source host numerical address, calculating a second prime factorization sequence for the destination host numerical address, and using the first and second prime factorization sequences to calculate a least common ancestor host unique numerical address by a greatest common divisor (GCD) calculation, and send data to the least common ancestor host; and a destination host to receive the data from the least common ancestor host and processes the data.

8. The system of claim 7, wherein the using the first and second prime factorization sequences is further adapted to:

compare the first and second prime factorization sequences to determine a longest common prefix; and calculate a least common ancestor host unique numerical address by multiplying together all numbers in the longest common prefix.

9. The system of claim 7, wherein the stateless routing protocol is implemented using source routing.

10. The system of claim 9, wherein the sending host is adapted to:

build a first route segment from the source host to the least common ancestor host by recursively adding parent hosts to a route list; and build a second route segment from the least common ancestor host to the destination host by calculating a prime factorization sequence of a result of dividing the numerical address of the destination host by the numerical address of the least common ancestor host to add any further host to the route list.

11. The system of claim 7, wherein the stateless routing protocol is implemented using hop-by-hop routing.

12. The system of claim 11, wherein a current host in the network receives data to send to the destination host, the current host adapted to:

determine whether or not it is in a first or a second route segment;

send the data to a parent host if it determines that it is in the first route segment; and send the data to a child host if it determines that it is in the second route segment;

wherein the child host is selected using a prime factorization sequence of a result of dividing the numerical address of the destination host address by the current host address.

* * * * *